(12) United States Patent
Zhang et al.

(10) Patent No.: US 9,118,756 B2
(45) Date of Patent: Aug. 25, 2015

(54) RECORDING METHOD, RECORDING DEVICE, AND ELECTRONIC DEVICE

(75) Inventors: Bo Zhang, Beijing (CN); Rui Zhu, Beijing (CN); Chunlei Zhao, Beijing (CN)

(73) Assignees: LENOVO (BEIJING) CO., LTD., Beijing (CN); BEIJING LENOVO SOFTWARE LTD., Beijing (CN)

( * ) Notice: Subject to any disclaimer, the term of this patent is extended or adjusted under 35 U.S.C. 154(b) by 0 days.

(21) Appl. No.: 14/237,835

(22) PCT Filed: Aug. 14, 2012

(86) PCT No.: PCT/CN2012/080111
§ 371 (c)(1),
(2), (4) Date: Feb. 7, 2014

(87) PCT Pub. No.: WO2013/023582
PCT Pub. Date: Feb. 21, 2013

(65) Prior Publication Data
US 2014/0192966 A1   Jul. 10, 2014

(30) Foreign Application Priority Data
Aug. 15, 2011   (CN) .......................... 2011 1 0233848

(51) Int. Cl.
*H04M 1/64* (2006.01)
*H04M 3/42* (2006.01)
(Continued)

(52) U.S. Cl.
CPC .......... *H04M 3/42221* (2013.01); *H04M 1/656* (2013.01); *H04M 3/2218* (2013.01); *H04M 2203/301* (2013.01)

(58) Field of Classification Search
CPC .......................... H04M 3/533; H04M 3/42221
USPC ................................. 379/67.1, 68
See application file for complete search history.

(56) References Cited

U.S. PATENT DOCUMENTS

2002/0160751 A1 * 10/2002 Sun et al. ............. 455/412
2010/0104074 A1    4/2010 Yang
(Continued)

FOREIGN PATENT DOCUMENTS

| CN | 201282375 | 10/2008 |
|----|-----------|---------|
| CN | 101854356 | 10/2010 |
| CN | 102025964 | 4/2011 |

OTHER PUBLICATIONS

Lenovo (Beijing) Co., LTD.; PCT/CN2012/080111 filed on Aug. 14, 2012; International Preliminary Search Report on Patentability in Chinese mailed on Feb. 18, 2014 and the Written Opinion of the International Searching Authority in Chinese mailed on Nov. 29, 2012; The International Bureau of WIPO; 10 pages.

(Continued)

*Primary Examiner* — Simon King
(74) *Attorney, Agent, or Firm* — Dentons US LLP (57) ABSTRACT

Embodiments of the present invention are directed to a recording method, and, corresponding to the recording method, a recording device and an electronic device. The recording method of the embodiments of the present invention is applicable in a first electronic device, where the first electronic device comprises a voice communication unit. The recording method comprises performing a voice communication with a second electronic device via the voice communication unit; during the voice communication, receiving a record command from a user; on the basis of the record command, performing a content recording and generating record data; generating communication identity information on the basis of the voice communication; when the content recording is completed, generating a record file via the record data, and correlating the communication identity information to the record file.

13 Claims, 7 Drawing Sheets

(51) Int. Cl.
*H04M 1/656* (2006.01)
*H04M 3/22* (2006.01)

(56) References Cited

U.S. PATENT DOCUMENTS

2012/0064869 A1\* 3/2012 Sharp .................... 455/414.1
2013/0044179 A1 2/2013 Peng

OTHER PUBLICATIONS

Lenovo (Beijing) Co., LTD.; PCT/CN2012/080111 filed on Aug. 14, 2012; English Translation of the International Preliminary Search Report on Patentability mailed on Feb. 18, 2014 and the Written Opinion of the International Searching Authority mailed on Nov. 29, 2012; The International Bureau of WIPO; 8 pages.
Chinese Patent No. 201110233848.5; State Intellectual Property Office of People's Republic of China; First Office Action mailed on Jul. 31, 2014; 8 pages.
English Translation of First Office Action for Chinese Patent No. 201110233848.5; State Intellectual Property Office of People's Republic of China; First Office Action mailed on Jul. 31, 2014; 10 pages.
English Abstract of Chinese Published Application No. 101282375 (A), published on Oct. 8, 2008; 1 page.
Partial English Translation of Chinese Published Application No. 101282375 (A), published on Oct. 8, 2008; 3 pages.
English Abstract of Chinese Published Application No. 102025964 (A), published on Apr. 20, 2011; 1 page.
English Abstract of Chinese Published Application No. 101854356 (A), published on Oct. 6, 2010; 1 page.
Chinese Patent Application No. 201110233848.5, Chinese Patent Office, Second Office Action mailed on Mar. 13, 2015; 6 pages.
English Text of Chinese Patent Application No. 201110233848.5, Chinese Patent Office, Second Office Action mailed on Mar. 13, 2015; 8 pages.

\* cited by examiner

RECORDING METHOD, RECORDING DEVICE, AND ELECTRONIC DEVICE

CROSS REFERENCE TO RELATED APPLICATIONS

This application is a national phase application based on international application number PCT/CN2012/080111, filed on Aug. 14, 2012, which claims priority of Chinese Patent Application No. CN 201110233848.5, filed on Aug. 15, 2011, the contents of both of which are incorporated by reference herein in their entireties.

TECHNICAL FIELD

The present application relates to a recording method, and corresponding to the recording method, a recording apparatus, and an electronic device.

BACKGROUND

With the development of the information industry, the voice communication is playing a more and more important role in the working and living of the people. For example, the user can easily perform the voice communication by the electronic device such as a portable computer, a tablet computer, a portable cell phone and a portable music player or the like.

However, it is a frequently encountered case that the user may inquire of other side about the information such as an address or telephone number, but it is inconvenient to record since there is no paper and pen at hand in making a phone call.

In the current terminal device, it has been proposed to add a recording key to the terminal device so that the information to be recorded can be recorded by recording as necessary. Besides, in the current terminal device, it has also been proposed to invoke the notebook to record the information. However, since the recorded information are usually managed by the applications such as file manager, notebook and recorder, it is hard to correlate them to the corresponding callings, so that it is inconvenient for the user to use the recorded information and it is easy to cause a confusion.

SUMMARY

The embodiments of the present application are intended to provide a recording method, a recording apparatus corresponding to the recording method and an electronic device to solve the above problems.

An embodiment of the present application provides a recording method applicable in a first electronic device, wherein the first electronic device comprises a voice communication unit, the recording method comprises performing a voice communication with a second electronic device via the voice communication unit; receiving a recording instruction from a user during the voice communication; performing a content recording according to the recording instruction and generating a record data; generating a communication identification information according to the voice communication; when the content record is completed, generating a record file via the record data, and correlating the communication identification information to the record file.

Another embodiment of the present application provides a recording apparatus applicable in a first electronic device, the recording apparatus comprises a voice communication unit configured to perform a voice communication with a second electronic device; an inputting unit configured to receive a recording instruction from a user during the voice communication; a recording unit configured to perform a content recording according to the recording instruction and generate a record data, and generate a record file via the record data when the content record is completed; an information generating unit configured to generate a communication identification information according to the voice communication; and a file correlating unit configured to correlate the communication identification information to the record file.

Another embodiment of the present application provides an electronic device comprises a voice communication unit configured to perform a voice communication with the other electronic device; an inputting unit configured to receive a recording instruction from a user during the voice communication; a recording unit configured to perform a content recording according to the recording instruction and generate a record data, and generate a record file via the record data when the content record is completed; a processing unit including an information generating module configured to generate the communication identification information according to the voice communication, a file correlating module configured to correlate the communication identification information to the record file.

In the technical solutions of the embodiments of the present application, it is convenient for the user to look up and use the generated record file by correlating the communication identification information relating to the call with the record file generated by the content recording initiated during the call. Besides, it is possible to prevent the user from confusing the record files when there is a plurality of record files.

BRIEF DESCRIPTION OF THE DRAWINGS

To illustrate the technical solutions of the embodiments of the present application, the accompanying drawings referenced to in the descriptions of the embodiments are described briefly. The accompanying drawings in the following descriptions are merely exemplary.

DETAILED DESCRIPTION

The preferred embodiments of the present application will be described as follows with reference to the accompanying drawings. Please note that, in the description and the accompanying drawings, elements with the same or the similar structure and function will be designated by the same reference numbers, and the repetitive explanation for these elements will be omitted.

In the following embodiments of the present application, the specific form of the electronic device includes, but is not limited to, a personal computer, a portable computer, a tablet computer, a mobile phone, a personal digital assistant (PDA), or the like.

Figure 1:
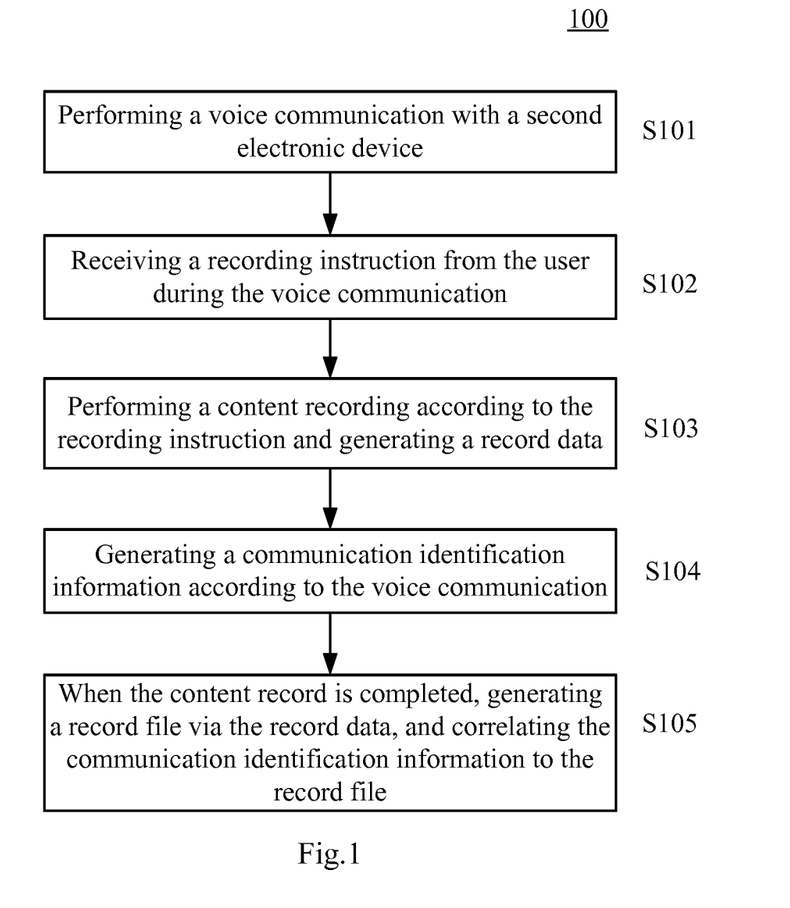
FIG. 1 is a flowchart describing the recording method according to an embodiment of the present application.

FIG. 1 is a flowchart describing the recording method according to an embodiment of the present application. In the following, the recording method according to an embodiment of the present application will be described with reference to FIG. 1. The recording method 100 can be applicable to a first electronic device with a voice communication unit.

As shown in FIG. 1, in step S101, a voice communication with a second electronic device is performed via the voice communication unit. In step S102, the recording instruction from the user is received during the voice communication. Furthermore, in step S103, a content recording is performed according to the recording instruction and a record data is generated.

According to an example of the present application, the recording instruction can be one or more of audio recording instruction, video recording instruction, image recording instruction, and text recording instruction. The content can be recorded in the corresponding form of text, voice, image, and/or video according to the recording instruction so as to the text, voice, image and/or video record data can be generated. For example, when the recording instruction is an audio recording instruction, it is possible to invoke the record application in the electronic device to record the voice information desired to be maintained. Alternatively, when the recording instruction is a text recording instruction, it is possible to invoke the text record application such as the notebook application in the electronic device to perform the content recording according to the text inputted. Similarly, when the recording instruction is a video and/or image recording instruction, it is possible to invoke the video and/or image record application such as the camera application in the electronic device to record the image and/or video information desired to be maintained.

In step S104, the communication identification information is generated according to the voice communication. According to an example of the present application, the communication identification information can comprise one or more of the telephone number used by the second electronic device, the name of the contact corresponding to the telephone number, the start time of the voice communication and the length of the call.

According to an example of the present application, the communication identification information can be generated when the voice communication with the second electronic device via the voice communication unit is started. For example, it is possible to generate the communication identification information comprising the telephone number used by the second electronic device, the name of the contact corresponding to the telephone number and/or the start time of the voice communication when the voice communication with the second electronic device via the voice communication unit is started. Alternatively, it is also possible to generate the communication identification information comprising the telephone number used by the second electronic device, the name of the contact corresponding to the telephone number, the end time of the voice communication and/or the duration of the voice communication when the voice communication with the second electronic device via the voice communication unit is ended.

Finally, when the content record is completed, in step S105, a record file is generated via the record data, and the communication identification information is correlated to the record file. According to an example of the present application, in step S105, the file name of the record file is generated according to the communication identification information as so to correlate the communication identification information to the record file. For example, the file name generated can comprise the name of the contact, the start time relating to the voice communication, etc. Thus, when the user searches for the record file of the specific content among a plurality of record files, it is possible to acquire the call corresponding to each record file according to the file name of the record file, so that it is possible to determine whether the content contained in the record file is the specific content to be searched for quickly. Alternatively, in step S105, the attribute information of the record file is generated according to the communication identification information as so to correlate the communication identification information to the record file. For example, the attribute information generated can comprise the name of the contact, the start time relating to the voice communication, etc. when the user searches for the record file of the specific content among a plurality of record files, it is possible to acquire the call corresponding to a record file by looking into the attribute information of each record file, so that it is possible to determine whether the content contained in the record file is the specific content to be searched for quickly.

Furthermore, according to an example of the present application, in step S105, it is possible to generate a new call record entry according to the communication identification information, and generate a file link directed to the record file generated via the record data in the call record entry. It will be described in detailed later with reference to the drawings.

In the recording method according to the embodiment, it is convenient for the user to look up and use the generated record file by correlating the communication identification information relating to the call with the record file generated by the content recording initiated during the call. Besides, it is possible to prevent the user from confusing the record files when there are a plurality of record files.

Below, the example of step 105 will be described in detailed with reference to FIG. 2 and FIG. 3, wherein a new call record entry is generated according to the communication identification information and a file link directed to the record file generated via the record data is generated in the call record entry so that the communication identification information is correlated to the record file generated via the record data.

Figure 2:
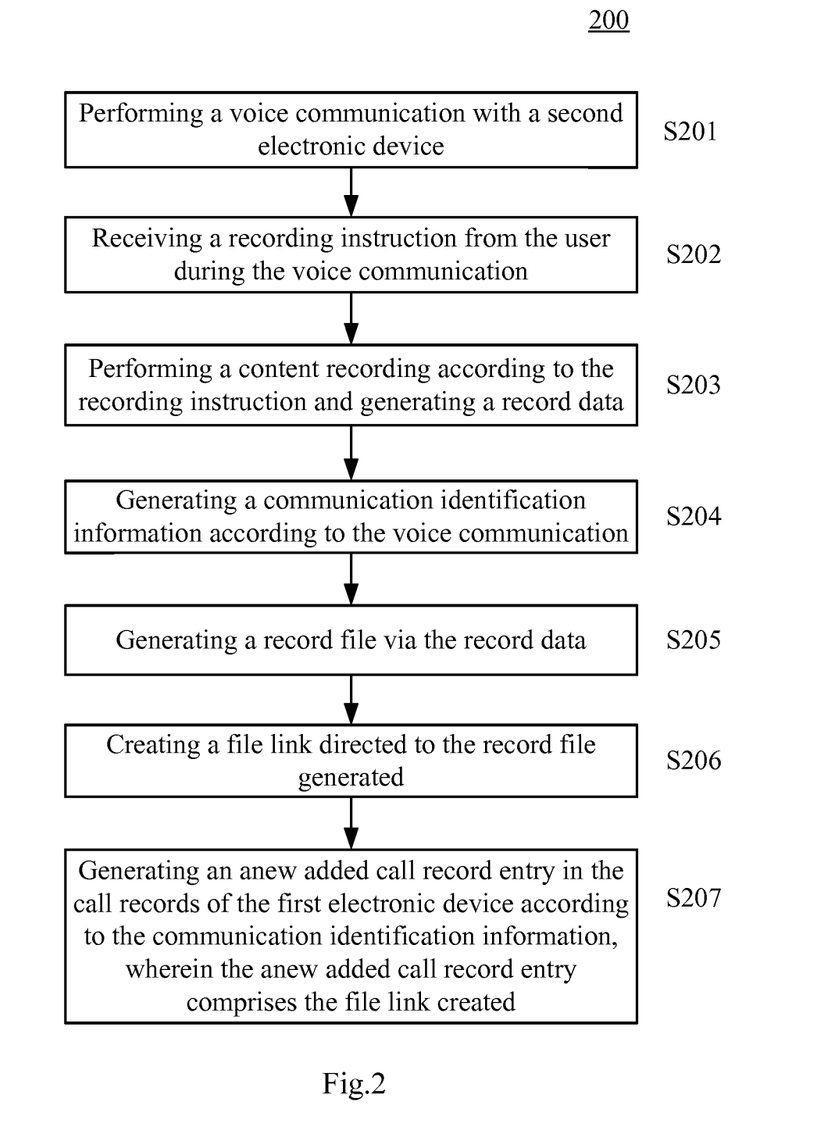
FIG. 2 is a flowchart describing the recording method according to another embodiment of the present application.

FIG. 2 is a flowchart describing the recording method 200 according to another embodiment of the present application. Similar to the recording method 100 shown in FIG. 1, the recording method 200 can be applicable to a first electronic device with a voice communication unit.

Specifically, in step S201, a voice communication with a second electronic device is performed via the voice communication unit. In step S202, the recording instruction from the user is received during the voice communication. Furthermore, in step S203, a content recording is performed according to the recording instruction and a record data is generated.

According to an example of the present application, the recording instruction can be one or more of audio recording instruction, video recording instruction, image recording instruction and text recording instruction. The content can be recorded in the corresponding form of text, voice, image and/or video according to the recording instruction so as to the text, voice, image and/or video record data. For example, when the recording instruction is an audio recording instruction, it is possible to invoke the record application in the electronic device to record the voice information desired to be maintained. Alternatively, when the recording instruction is a text recording instruction, it is possible to invoke the text record application such as the notebook application in the electronic device to perform the content recording according to the text inputted. Similarly, when the recording instruction is a video and/or image recording instruction, it is possible to invoke the video and/or image record application such as the camera application in the electronic device to record the image and/or video information desired to be maintained.

In step S204, the communication identification information is generated according to the voice communication. According to an example of the present application, the communication identification information can comprise one or more of the telephone number used by the second electronic device, the name of the contact corresponding to the telephone number, the start time of the voice communication and the length of the call.

According to an example of the present application, the communication identification information can be generated when the voice communication with the second electronic device via the voice communication unit is started. For example, it is possible to generate the communication identification information comprising the telephone number used by the second electronic device, the name of the contact corresponding to the telephone number and/or the start time of the voice communication when the voice communication with the second electronic device via the voice communication unit is started. Alternatively, it is also possible to generate the communication identification information comprising the telephone number used by the second electronic device, the name of the contact corresponding to the telephone number, the end time of the voice communication and/or the duration of the voice communication when the voice communication with the second electronic device via the voice communication unit is ended.

When the content record is completed, in step S205, a record file is generated via the record data. In step S206, a file link directed to the record file generated is created. Finally, in step S207, an anew added call record entry is generated in the call records of the first electronic device according to the communication identification information, wherein the anew added call record entry comprises the file link created. For example, the anew added call record entry can comprise a link address. The link address may be the storage address of the record file. When the user performs an operation such as click or double-click on the link address in the anew added call record entry, it is possible to open the record file stored in the address, so that it is convenient to look up the content once recorded quickly. Besides, according to another example of the present application, there is no need to display the storage address of the record file in the anew added call record entry directly; alternatively, the anew added call record entry can comprise a link icon. When the user performs an operation such as click or double-click on the link icon, it is possible to open the record file stored in the address, so that it is convenient to look up the content once recorded quickly.

Preferably, it is possible to set the different link icons for the different types of record files. FIG. 3 is an explanatory diagram showing an exemplary case of the call records according to an embodiment of the present application. As shown in FIG. 3, in the call records 300, the entry 2 comprises a link icon 320, which indicates that there is a text type of record file correlated to the entry 2. The entry 3 comprises a link icon 330, which indicates that there is a audio type of record file correlated to the entry 3. The entry 5 comprises a link icon 350, which indicates that there are several types of record files correlated to the entry 5. According to the recording method in this example, the user can realize whether there is a record file corresponding to each call record entry intuitively upon checking the call records. Furthermore, when there is a record file corresponding to the call record entry, it is possible to acquire further information of the record file (for example, the type of the record file) by the link icon.

In the recording method of the present embodiment, the user is enabled to realize which call record entry has a record file corresponding to it upon checking the call records by generating a file link directed to the record file generated via the record data in the call record entry so as to correlate the communication identification information to the record file generated via the record data. Furthermore, it is convenient for the user to check the record file relating to the call by opening the related record file through a link without opening the record file by initiating the text, audio, image, and/or video applications.

Figure 3:
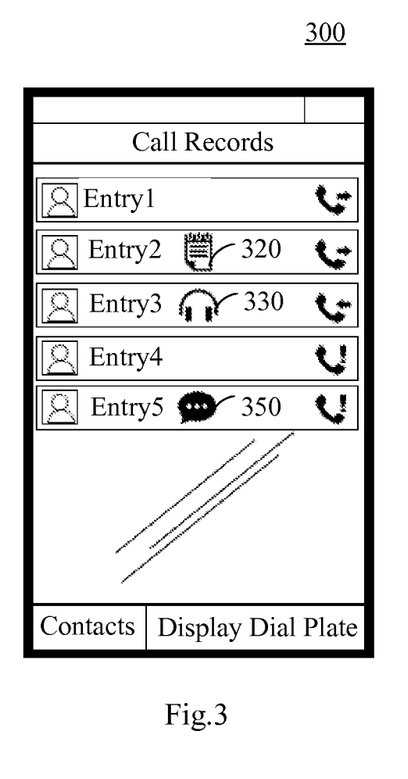
FIG. 3 is an explanatory diagram showing an exemplary case of the call records according to an embodiment of the present application.

Note that, the steps in the methods shown in FIG. 2 and FIG. 3 are not necessarily performed in the order as shown, but some steps can be performed in a reverse order or in parallel. For example, during a voice communication, receiving the recording instruction from the user (S102, S202) and performing a content recording, according to the recording instruction, and generating the record data (S103, S203) can be perform in parallel with generating the communication identification information, according to the voice communication (S104, S204). It is also possible to perform steps S104 and S204 first and then perform steps S102, S202 and S103, S203.

In addition, according to another example of the present application, after correlating the communication identification information to the record file generated via the record data, according to the method 200 as shown in FIG. 2, when the user chooses to delete the call record entry comprising a link, the file name and the attribute information of the record file corresponding to the file link in the call record entry can be amended, according to the communication identification information contained in the call record entry, so that even the target call record entry is deleted. The user can acquire the call corresponding to each record file, according to the file name and the attribute information of the record file, upon searching for the record file with certain content in a plurality of record files. Thus, it is possible to determine whether the content contained in the record file is the certain content to be searched for quickly.

Figure 4:
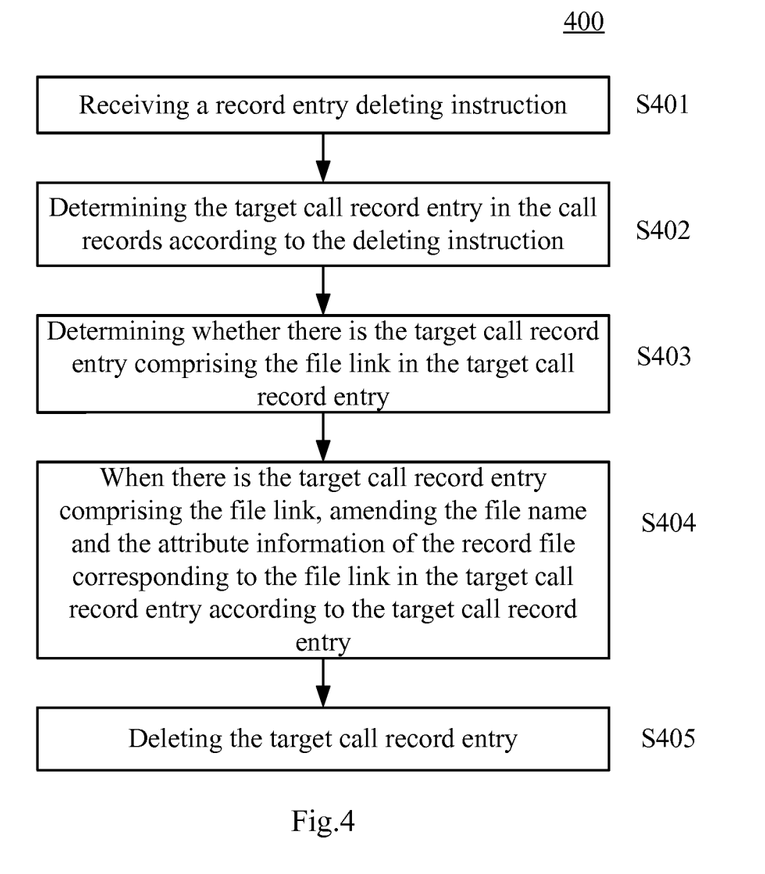
FIG. 4 is a flowchart showing the method of deleting a call record entry from the call records after correlating the communication identification information to the record file generated via the record data according to the method shown in FIG. 2 according to an embodiment of the present application.

FIG. 4 is a flowchart showing the method of deleting a call record entry from the call record after correlating the communication identification information to the record file generated via the record data according to the method 200 shown in FIG. 2 according to an embodiment of the present application.

As shown in FIG. 4, in step S401, a record entry deleting instruction is received. In step S402, the target call record entry in the call records is determined according to the deleting instruction. Furthermore, in step S403, it is determined that whether there is the target call record entry comprising the file link in the target call record entry. When there is the target call record entry comprising the file link, in step S404, the file name and the attribute information of the record file corresponding to the file link in the target call record entry can be amended according to the target call record entry. For example, the file name and the attribute information of the record file corresponding to the file link in the target call record entry can be amended according to the telephone number, the contact name corresponding to the telephone number and/or the start time of the voice communication contained in the call record. Finally, in step S405, the target call record entry can be deleted.

In addition, according to another example of the present application, after correlating the communication identification information to the record file generated via the record data, according to the method 200 as shown in FIG. 2, when the user chooses to delete the call record entry comprising a link, a prompt information for prompting the user whether to delete the call record entry comprising the link.

Figure 5:
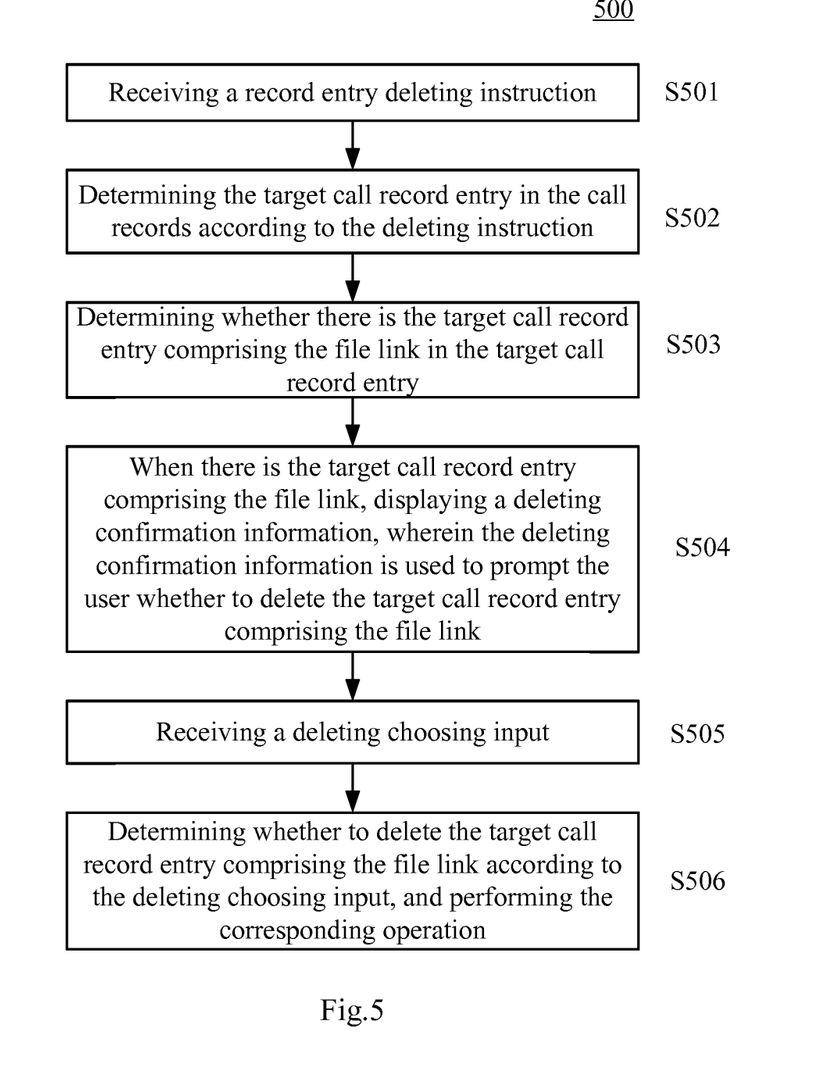
FIG. 5 is a flowchart showing the method of deleting a call record entry from the call records after correlating the communication identification information to the record file generated via the record data according to the method shown in FIG. 2 according to another embodiment of the present application.

FIG. 5 is a flowchart showing the method of deleting a call record entry from the call record after correlating the communication identification information to the record file generated via the record data according to the method 200 shown in FIG. 2 according to another embodiment of the present application.

As shown in FIG. 5, in step S501, a record entry deleting instruction is received. In step S502, the target call record entry in the call records is determined according to the deleting instruction. Furthermore, in step S503, it is determined that whether there is the target call record entry comprising the file link in the target call record entry. When there is the target call record entry comprising the file link, in step S504, a deleting confirmation information is displayed, wherein the deleting confirmation information is used to prompt the user whether to delete the target call record entry comprising the file link. In step S505, a deleting choosing input is received. Finally, in step S506, it is determined whether to delete the target call record entry comprising the file link according to the deleting choosing input, and the corresponding operation is performed. For example, when the user chooses not to delete, the target call record entry comprising the file link can be maintained. For example, when the user chooses to delete, the target call record entry comprising the file link can be deleted.

In addition, alternatively, after the user chooses to delete the target call record entry comprising the file link, the file name and the attribute information of the record file corresponding to the file link in the call record entry can be amended, according to the target call record entry so that it is convenient for the user to look up the record files later. Alternatively, after the user chooses to delete the target call record entry comprising the file link, the target call record entry and record file correlated to the target call record entry can be deleted.

Figure 6:
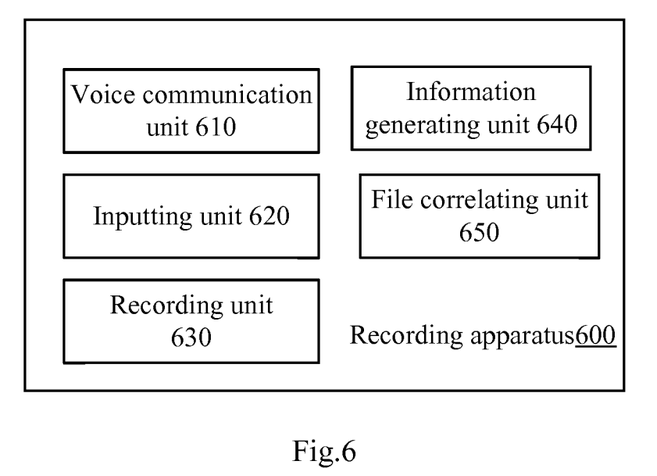
FIG. 6 shows an exemplary structure block diagram of the recording apparatus according to an embodiment of the present application.

Below, the recording apparatus according to the embodiment of the present application will be described with reference to FIG. 6. FIG. 6 shows an exemplary structure block diagram of the recording apparatus 600 according to an embodiment of the present application. As shown in FIG. 6, the recording apparatus 600 of the embodiment comprises a voice communication unit 610, an inputting unit 620, a recording unit 630, an information generating unit 640, and a file correlating unit 650. The units of the recording apparatus 600 perform the respective step/function of the recording method in FIG. 1, thus the detailed description is omitted for conciseness.

For example, a voice communication with a second electronic device can be performed via the voice communication unit 610. The inputting unit 620 can receive the recording instruction from the user during the voice communication.

The recording unit 630 can perform a content recording according to the recording instruction and generate a record data, and when the content recording is completed, the recording unit 630 can generate a record file via the record data.

According to an example of the present application, the recording instruction can be one or more of audio recording instruction, video recording instruction, image recording instruction, and text recording instruction. According to the recording instruction, the recording unit 630 can perform the content recording in the corresponding form of text, voice, image, and/or video to generate the text, voice, image, and/or video record data.

The information generating unit 640 can generate the communication identification information according to the voice communication. According to an example of the present application, the communication identification information can comprise one or more of the telephone number used by the second electronic device, the name of the contact corresponding to the telephone number, the start time of the voice communication and the length of the call.

According to an example of the present application, the communication identification information can be generated by the information generating unit 640 when the voice communication with the second electronic device via the voice communication unit is started. For example, the information generating unit 640 can generate the communication identification information comprising the telephone number used by the second electronic device, the name of the contact corresponding to the telephone number and/or the start time of the voice communication when the voice communication with the second electronic device via the voice communication unit is started. Alternatively, the information generating unit 640 also can generate the communication identification information comprising the telephone number used by the second electronic device, the name of the contact corresponding to the telephone number, the end time of the voice communication, and/or the duration of the voice communication when the voice communication with the second electronic device via the voice communication unit is ended.

When the content record is completed, the file correlating unit 650 can correlate the communication identification information to the record file. According to an example of the present application, the file correlating unit 650 can generate the file name of the record file according to the communication identification information as so to correlate the communication identification information to the record file. For example, the file name generated can comprise the name of the contact, the start time relating to the voice communication, etc. Thus, when the user searches for the record file of the specific content among a plurality of record files, it is possible to acquire the call corresponding to each record file according to the file name of the record file, so that it is possible to determine whether the content contained in the record file is the specific content to be searched for quickly. Alternatively, the file correlating unit 650 can generate the attribute information of the record file according to the communication identification information as so to correlate the communication identification information to the record file. For example, the attribute information generated can comprise the name of the contact, the start time relating to the voice communication, etc. when the user searches for the record file of the specific content among a plurality of record files, it is possible to acquire the call corresponding to a record file by looking into the attribute information of each record file, so that it is possible to determine whether the content contained in the record file is the specific content to be searched for quickly.

Furthermore, according to an example of the present application, the file correlating unit 650 can generate a file link directed to the record file generated via the record data in the call record entry. Further, the file link generated by the file correlating unit 650 can be contained in the anew added call record entry generated according to the communication identification information. Specifically, the file correlating unit 650 can comprise a link module. The link module can generate a link directed to the record file generated by the recording unit 630 when the content record is completed. The recording apparatus 600 can further a call records generating unit. The call records generating unit can generate an anew added call record entry according to the communication identification information in the call records of the first electronic device, wherein the anew added call record entry comprises the link generated by the link module.

For example, the anew added call record entry can comprise a link address. The link address may be the storage address of the record file. When the user performs an operation such as click or double-click on the link address in the anew added call record entry, it is possible to open the record file stored in the address, so that it is convenient to look up the content once recorded quickly. Besides, according to another example of the present application, there is no need to display the storage address of the record file in the anew added call record entry directly; alternatively, the anew added call record entry can comprise a link icon. When the user performs an operation such as click or double-click on the link icon, it is possible to open the record file stored in the address, so that it is convenient to look up the content once recorded quickly.

In the recording apparatus according to the embodiment, it is convenient for the user to look up and use the generated record file by correlating the communication identification information relating to the call to the record file generated by the content recording initiated during the call. Besides, it is possible to prevent the user from confusing the record files when there are a plurality of record files.

In addition, in the detailed example of the present embodiment, the user is enabled to realize which call record entry has a record file corresponding to it upon checking the call records by generating a file link directed to the record file generated via the record data in the call record entry so as to correlate the communication identification information to the record file generated via the record data. Furthermore, it is convenient for the user to check the record file relating to the call by opening the related record file through a link without opening the record file by initiating the text, audio, image, and/or video applications.

In addition, according to another example, in the case that the link is created by the file correlating unit, and the communication identification information is correlated to the record file, the recording apparatus further comprises a deleting unit. When the inputting unit receives a record deleting instruction, the call record entry in the call records is deleted.

According to an example of the present application, when the inputting unit receives a record deleting instruction, the file name and the attribute information of the record file corresponding to the file link in the target call record entry can be amended according to the communication identification information contained in the call record entry to be deleted, so that even if the target call record entry is deleted, the user can acquire the call corresponding to each record file according to the file name and the attribute information of the record file upon searching for the record file with certain content in a plurality of record files, thus it is possible to determine whether the content contained in the record file is the certain content to be searched for quickly.

Figure 7:
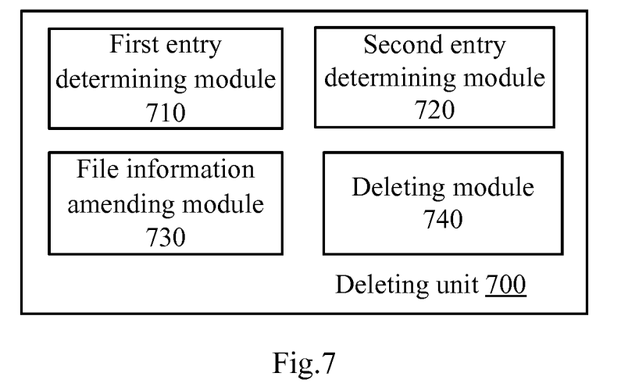
FIG. 7 shows an exemplary structure block diagram of the deleting unit in the recording apparatus according to an embodiment of the present application.

FIG. 7 shows an exemplary structure block diagram of the deleting unit 700 in the recording apparatus according to an embodiment of the present application. As shown in FIG. 7, the deleting unit 700 of the present embodiment comprises a first entry determining module 710, a second entry determining module 720, a file information amending module 730, and a deleting module 740.

The modules of the deleting unit 700 perform the respective step/function of the deleting method in FIG. 4, thus the detailed description is omitted for conciseness.

For example, the first entry determining module 710 can determine the target call record entry in the call records according to the deleting instruction. The second entry determining module 720 can determine that whether there is the target call record entry comprising the file link directed to the record file in the target call record entry. When the second entry determining module 720 determines there is the target call record entry comprising the file link directed to the record file, the file information amending module 730 can amend the file name and the attribute information of the record file corresponding to the file link in the target call record entry according to the target call record entry. For example, the file name and the attribute information of the record file corresponding to the file link in the target call record entry can be amended according to the telephone number, the contact name corresponding to the telephone number and/or the start time of the voice communication contained in the call record. The deleting module 740 can delete the target call record entry. Thus after the target call record entry in the call records is deleted, the user can acquire the call corresponding to each record file according to the file name and the attribute information of the record file upon searching for the record file with certain content in a plurality of record files, thus it is possible to determine the content contained in the record file quickly.

Figure 8:
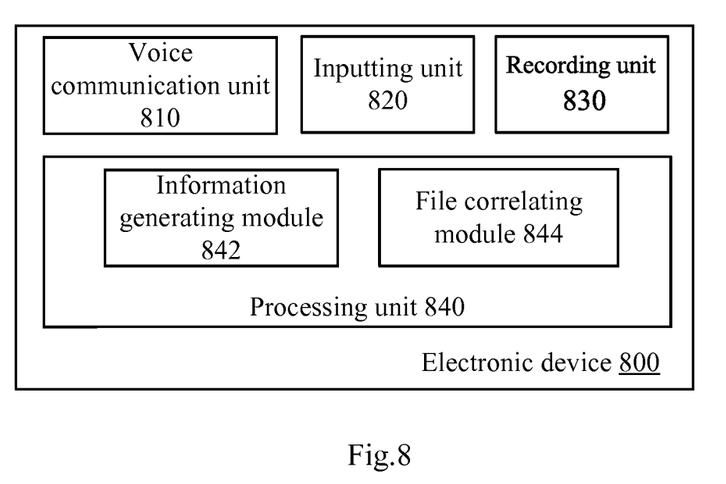
FIG. 8 shows an exemplary structure block diagram of the electronic device according to an embodiment of the present application.

Below, the electronic device according to the embodiment of the present application will be described with reference to FIG. 8. FIG. 8 shows an exemplary structure block diagram of the electronic device 800 according to an embodiment of the present application. As shown in FIG. 8, the electronic device 800 of the embodiment comprises a voice communication unit 810, an inputting unit 820, a recording unit 830, and a processing unit 840. The units of the electronic device 800 perform the respective step/function of the recording method in FIG. 1, thus the detailed description is omitted for conciseness.

For example, a voice communication with a second electronic device can be performed via the voice communication unit 810. The inputting unit 820 can receive the recording instruction from the user during the voice communication. The recording unit 830 can perform a content recording according to the recording instruction and generate a record data, and when the content recording is completed, the recording unit 830 can generate a record file via the record data.

According to an example of the present application, the recording instruction can be one or more of audio recording instruction, video recording instruction, image recording instruction, and text recording instruction. According to the recording instruction, the recording unit 830 can perform the content recording in the corresponding form of text, voice, image, and/or video to generate the text, voice, image, and/or video record data.

The processing unit 840 can comprise an information generating module 842 and a file correlating module 844. The information generating module 842 can generate the communication identification information according to the voice communication. According to an example of the present application, the communication identification information can comprise one or more of the telephone number used by the second electronic device, the name of the contact corresponding to the telephone number, the start time of the voice communication and the length of the call.

When the content record is completed, the file correlating module 844 can correlate the communication identification information to the record file. According to an example of the present application, the file correlating module 844 can generate the file name of the record file according to the communication identification information as so to correlate the communication identification information to the record file. For example, the file name generated can comprise the name of the contact, the start time relating to the voice communication, etc. Thus, when the user searches for the record file of the specific content among a plurality of record files, it is possible to acquire the call corresponding to each record file according to the file name of the record file, so that it is possible to determine whether the content contained in the record file is the specific content to be searched for quickly. Alternatively, when the content record is completed, the file correlating module 844 can generate the attribute information of the record file according to the communication identification information as so to correlate the communication identification information to the record file. For example, the attribute information generated can comprise the name of the contact, the start time relating to the voice communication, etc. when the user searches for the record file of the specific content among a plurality of record files, it is possible to acquire the call corresponding to a record file by looking into the attribute information of each record file, so that it is possible to determine whether the content contained in the record file is the specific content to be searched for quickly.

Furthermore, according to an example of the present application, the file correlating module 844 can generate a file link directed to the record file generated via the record data in the call record entry. Furthermore, the file link generated by the file correlating module 844 can be contained in the anew added call record entry generated according to the communication identification information, to correlate the communication identification information to the record file.

In the electronic device according to the embodiment, it is convenient for the user to look up and use the generated record file by correlating the communication identification information relating to the call to the record file generated by the content recording initiated during the call. Besides, it is possible to prevent the user from confusing the record files when there are a plurality of record files.

In the embodiment of the invention, the module can be implemented in software for execution by various types of processors. For example, an identification module of executable code may include one or more physical or logical blocks of computer instructions, for example, which can be constructed as an object, procedure, or function. Nevertheless, the identified module of executable code without physically located together, but may include different instructions stored in different bit on, when these instructions are logically combined together, and its constituent units/modules and achieve the unit/modules specified purposes.

When the module can be implemented using software, taking into account the level of the existing hardware technology, it can be implemented in software, the module, in the case of not considering the cost of skilled in the art can build the corresponding hardware circuit to achieve the function corresponding to the hardware circuit comprises a conventional ultra-large scale integrated (VLSI) circuit or a gate array, such as logic chips, existing semiconductor of the transistor and the like, or other discrete components. The module may further with the programmable hardware device, such as a field programmable gate array, programmable array logic, programmable logic devices, etc. to achieve.

Those skilled in the art can realize that the units and steps of an algorithm described in conjunction with the embodiments disclosed in this specification can be implemented by the electronic hardware, the computer software, or the combination of both. To illustrate the interchangeability of the hardware and software clearly, the constitution and steps of the example have been generally described in terms of function in the above illustration. To execute the function in the form of hardware or software depends on the specific application of the technical solution and the design constraint. Those skilled in the art can use different methods to fulfill the functions with respect to each application, which should not be deemed as going beyond the scope of the present application.

It should be understood by those skilled in the art that various modifications, combinations, sub-combinations and alterations may occur depending on design requirements and other factors insofar as they are within the scope of the appended claims or the equivalents thereof.

What is claimed is:

1. A recording method applicable in a first electronic device, wherein the first electronic device comprises a voice communication unit, the recording method comprising:
   performing a voice communication with a second electronic device via the voice communication unit;
   receiving a recording instruction from a user during the voice communication;
   performing a content recording according to the recording instruction and generating a record data;
   generating a communication identification information according to the voice communication; and
   when the content record is completed, generating a record file via the record data, and correlating the communication identification information to the record file.

2. The recording method of claim 1, wherein the communication identification information comprises a telephone number used by the second electronic device, a name of contact corresponding to the telephone number, a start time of the voice communication and/or a length of the voice communication.

3. The recording method of claim 1, wherein the correlating of the communication identification information to the record file comprises:
   generating a file name of the record file according to the communication identification information.

4. The recording method of claim 1, wherein the correlating of the communication identification information to the record file comprises:
   generating attribute information of the record file according to the communication identification information.

5. The recording method of claim 1, wherein the correlating of the communication identification information to the record file comprises:
   creating a file link directed to the record file; and
   generating an anew added call record entry in call records of the first electronic device according to the communication identification information, wherein the anew added call record entry comprises the file link.

6. The recording method of claim 5, further comprises:
   receiving a record entry deleting instruction;
   determining a target call record entry in the call records according to the deleting instruction;

determining whether there is a target call record entry comprising the file link in the target call record entry;

when there is the target call record entry comprising the file link, amending a file name and attribute information of the record file corresponding to the file link in the target call record entry according to the target call record entry; and deleting the target call record entry.

7. The recording method of claim 5, further comprises:
receiving a record entry deleting instruction;
determining a target call record entry in the call records according to the deleting instruction;
determining whether there is a target call record entry comprising the file link in the target call record entry;
when there is the target call record entry comprising the file link, displaying a deleting confirmation information,
wherein the deleting confirmation information is used to prompt the user whether to delete the target call record entry comprising the file link;
receiving deleting choosing input; and
determining whether to delete the target call record entry comprising the file link according to the deleting choosing input.

8. The recording method of claim 1, wherein the performing of the content recording according to the recording instruction comprises:
performing the content recording in a form of text, voice, image and/or video according to the recording instruction.

9. A recording apparatus applicable in a first electronic device, the recording apparatus comprising:
a voice communication unit configured to perform a voice communication with a second electronic device;
an inputting unit configured to receive a recording instruction from a user during the voice communication;
a recording unit configured to perform a content recording according to the recording instruction and generate a record data, and generate a record file via the record data when the content record is completed;
an information generating unit configured to generate a communication identification information according to the voice communication; and
a file correlating unit configured to correlate the communication identification information to the record file.

10. The recording apparatus of claim 9, wherein the file correlating unit generates a file name and/or attribute information of the record file according to the communication identification information.

11. The recording apparatus of claim 9, wherein the file correlating unit comprises:
a link module configured to create a link directed to the record file, the recording apparatus further comprises:
a call records generating unit configured to generate an anew added call record entry according to the communication identification information in the call records of the first electronic device, wherein the anew added call record entry comprises the link generated by the link module.

12. The recording apparatus of claim 9, wherein the inputting unit is further configured to receive a record entry deleting instruction, the recording apparatus further comprises:
a deleting unit including a first entry determining module configured to determine a target call record entry in call records according to the deleting instruction;
a second entry determining module configured to determine whether there is the target call record entry comprising the file link directed to the record file in the target call record entry;
a file information amending module configured to, when the second entry determining module determines that there is the target call record entry comprising the file link directed to the record file, amend a file name and attribute information of the record file corresponding to the file link in the target call record entry according to the target call record entry; and
a deleting module configured to delete the target call record entry.

13. An electronic device comprising:
a voice communication unit configured to perform a voice communication with another electronic device;
an inputting unit configured to receive a recording instruction from a user during the voice communication;
a recording unit configured to perform a content recording according to the recording instruction and generate a record data, and generate a record file via the record data when the content record is completed;
a processing unit including
an information generating module configured to generate communication identification information according to the voice communication, and
a file correlating module configured to correlate the communication identification information to the record file.

* * * * *